US012775648B1

(12) United States Patent
Chikkalli et al.

(10) Patent No.: US 12,775,648 B1
(45) Date of Patent: Oct. 27, 2026

(54) SYSTEMS AND METHODS OF PARTIAL CONTENT HIGHLIGHTING FOR ELECTRONIC DISCOVERY

(71) Applicant: Open Text Inc., Wilmington, DE (US)

(72) Inventors: Shivanand Chikkalli, Hyderabad (IN); Nikhil Raj, Hyderabad (IN); Lalitha Kaparapu, Hyderabad (IN)

(73) Assignee: Open Text Inc., Wilmington, DE (US)

( * ) Notice: Subject to any disclaimer, the term of this patent is extended or adjusted under 35 U.S.C. 154(b) by 0 days.

(21) Appl. No.: 19/315,335

(22) Filed: Aug. 29, 2025

Related U.S. Application Data

(63) Continuation of application No. 19/315,268, filed on Aug. 29, 2025.

(51) Int. Cl.
*G06F 16/334* (2025.01)
*G06F 16/31* (2019.01)

(52) U.S. Cl.
CPC ............ *G06F 16/334* (2019.01); *G06F 16/31* (2019.01)

(58) Field of Classification Search
CPC ............................... G06F 16/334; G06F 16/31
See application file for complete search history.

(56) References Cited

U.S. PATENT DOCUMENTS

2015/0095312 A1* 4/2015 Gulwani ............... G06F 16/284 707/722
2026/0148278 A1* 5/2026 Zhao .................. G06Q 30/0631

* cited by examiner

*Primary Examiner* — Jay A Morrison
(74) *Attorney, Agent, or Firm* — Carr & Ferrell LLP; Myrna M. Schelling

(57) ABSTRACT

Systems and methods for partial content highlighting are provided. The method begins with receiving a workbook document. Cell data of the workbook document is pre-processed. For each worksheet of the workbook document, the cell data is indexed to generate an indexed file. When the cell data is indexed, the indexed file is stored in a key-value store associated with the workbook document. The key-value store is configured to store the indexed cell data in key-value pairs, where a value includes a position of a key. A search term is received and converted into a regular expression. For every key of the key-value store, a determination is made whether the regular expression matches the key. When the regular expression matches the key, occurrence information is determined. Based on the occurrence information, a graphical user interface is generated and displayed to show partial text highlighting of the text of the search result.

20 Claims, 12 Drawing Sheets

SYSTEMS AND METHODS OF PARTIAL CONTENT HIGHLIGHTING FOR ELECTRONIC DISCOVERY

CROSS-REFERENCE TO RELATED APPLICATIONS

The present application is a continuation and claims the priority benefit of U.S. patent application Ser. No. 19/315,268, filed on Aug. 29, 2025, entitled "Systems and Methods of Optimized Search for Electronic Discovery," the disclosure of which is incorporated by reference herein for all purposes.

FIELD

The present disclosure pertains to the field of partial content highlighting in legal and document review contexts, specifically focusing on a system for enhancing electronic discovery ("eDiscovery") through optimized multi-word search techniques in spreadsheet documents and partial content highlighting of text of a search result within a portion of a cell of the worksheet.

BACKGROUND

Legal professionals are often required to review vast amounts of documents and information. Traditionally, legal professionals who wish to search for a keyword or a search term are limited to inefficient, time-consuming, and labor-intensive searches of spreadsheet documents (such as a Microsoft® Excel® workbook having a plurality of worksheets or tables of data). Furthermore, user manual review by legal professionals for search terms in multiple spreadsheets can be fraught with user error. Finally, using conventional systems, a legal professional must manually search one worksheet of a workbook at a time, and one search term at a time, using, for instance, control-F (Find) word searches. Even if a search term is located using a conventional system, typically, the conventional system highlights the entire worksheet or table cell that contains the search term result, which is rather imprecise and may lead to confusion for the legal professional.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for optimizing a search in a document review and electronic discovery software platform that can be executed by an example system in accordance with various embodiments of the present invention. The method includes receiving a workbook document by the document review and electronic discovery software platform. The workbook document includes one or more worksheets. A worksheet includes cell data, which is the data in one or more cells of the worksheet. The method includes pre-processing the cell data of the workbook document. In some embodiments, the pre-processing of the cell data occurs in parallel multi-threads processed by one or more computer processors, in order to enhance computer performance and processing efficiency, and to quickly obtain the search results of the optimized search.

During the pre-processing of the cell data, the cell data of the workbook document is extracted. Then, the cell data is partitioned into multi-threads, where each of the multi-threads represents each of the one or more worksheets of the workbook document. For each worksheet of the workbook document, the cell data is indexed to generate an indexed file. When all the cell data is indexed, the indexed file is stored in a key-value store associated with the workbook document. The key-value store is configured to store the indexed cell data in key-value pairs, where a value includes a position of a key.

The method further includes receiving one or more search terms, typically from the user via the document review and electronic discovery software platform. The method continues with converting one or more search terms into a regular expression. Then, for every key of the key-value store, a determination is made whether the regular expression matches the key; and when the regular expression matches the key, occurrence information is determined.

The method also includes locating, based on the occurrence information, an exact table data element in a Document Object Model (DOM). The method further includes generating a user interface depicting a worksheet of the workbook document, based on the DOM. Based on the exact table data element in the Document Object Model (DOM) and the occurrence information, the method includes partial text highlighting of a text of a search result in the generated user interface. The partial text highlighting comprises highlighting the text of the search result within a portion of a cell of the worksheet. The method finally concludes with displaying the user interface depicting the worksheet with the partial text highlighting of the text of the search result to the user, via the document review and electronic discovery software platform.

One general aspect includes a system for optimizing a search within an electronic discovery software platform. The system includes a processor and memory for storing instructions, the processor executing the instructions to: receive a workbook document by the document review and electronic discovery software platform; pre-process the cell data of the workbook document including extract the cell data of the workbook document and partition the cell data into multi-threads, where each of the multithreads represents each of the one or more worksheets of the workbook document; for each worksheet of the workbook document, index the cell data to generate an indexed file; when all the cell data is indexed, store the indexed file in a key-value store associated with the workbook document, the key-value store being configured to store the indexed cell data in key-value pairs, where a value includes a position of a key; receive one or more search terms; convert one or more search terms into a regular expression; for every key of the key-value store, determine whether the regular expression matches the key, and when the regular expression matches the key, determine occurrence information; locate, based on the occurrence information, an exact table data element in a Document Object Model (DOM); generate a user interface depicting a worksheet of the workbook document; based on the Document Object Model (DOM), generate or update a user interface; based on the exact table data element in the Document Object Model (DOM) and the occurrence information, partial text highlighting of a text of a search result in the generated user interface; and display the user interface depicting the worksheet with the partial text highlighting of the text of the search result is displayed to the user, via the document review and electronic discovery software platform.

A further general aspect includes a method for optimizing a search in a document review and electronic discovery software platform. The method begins with receiving a workbook document. The workbook document includes one or more worksheets. Each worksheet has cell data. The cell data can be data in one or more cells of the worksheet. The method continues with pre-processing by multithreads, via one or more computer processors, the cell data of the workbook document. The pre-processing includes the steps of extracting the cell data of the workbook document; partitioning the cell data into the multithreads, where the multithreads represent each of the one or more worksheets of the workbook document; and for each worksheet of the workbook document: indexing the cell data to generate an indexed file, and storing the indexed file in a key-value store associated with the workbook document. The key-value store is configured to store the indexed cell data in key-value pairs, where a value includes a position of a key. The method continues with receiving one or more search terms to be used in the search of the workbook document; and converting the one or more search terms into a regular expression. For every key of the key-value store, there is a determination whether the regular expression matches the key. When the regular expression matches the key, occurrence information is also determined. The occurrence information is stored in a database associated with the document review and electronic discovery software platform. A graphical user interface of the one or more worksheets of the workbook document is generated by the document review and electronic discovery software platform. Based on the occurrence information, text of a search result matching the one or more search terms is displayed on the graphical user interface.

Other embodiments of this aspect include corresponding computer systems, apparatus, and computer programs recorded on one or more computer storage devices, each configured to perform the actions of the methods.

BRIEF DESCRIPTION OF THE DRAWINGS

Exemplary embodiments are illustrated by way of example and not limited by the figures of the accompanying drawings, in which references indicate similar elements.

DETAILED DESCRIPTION OF EXAMPLE EMBODIMENTS

Overview

Figure 1:
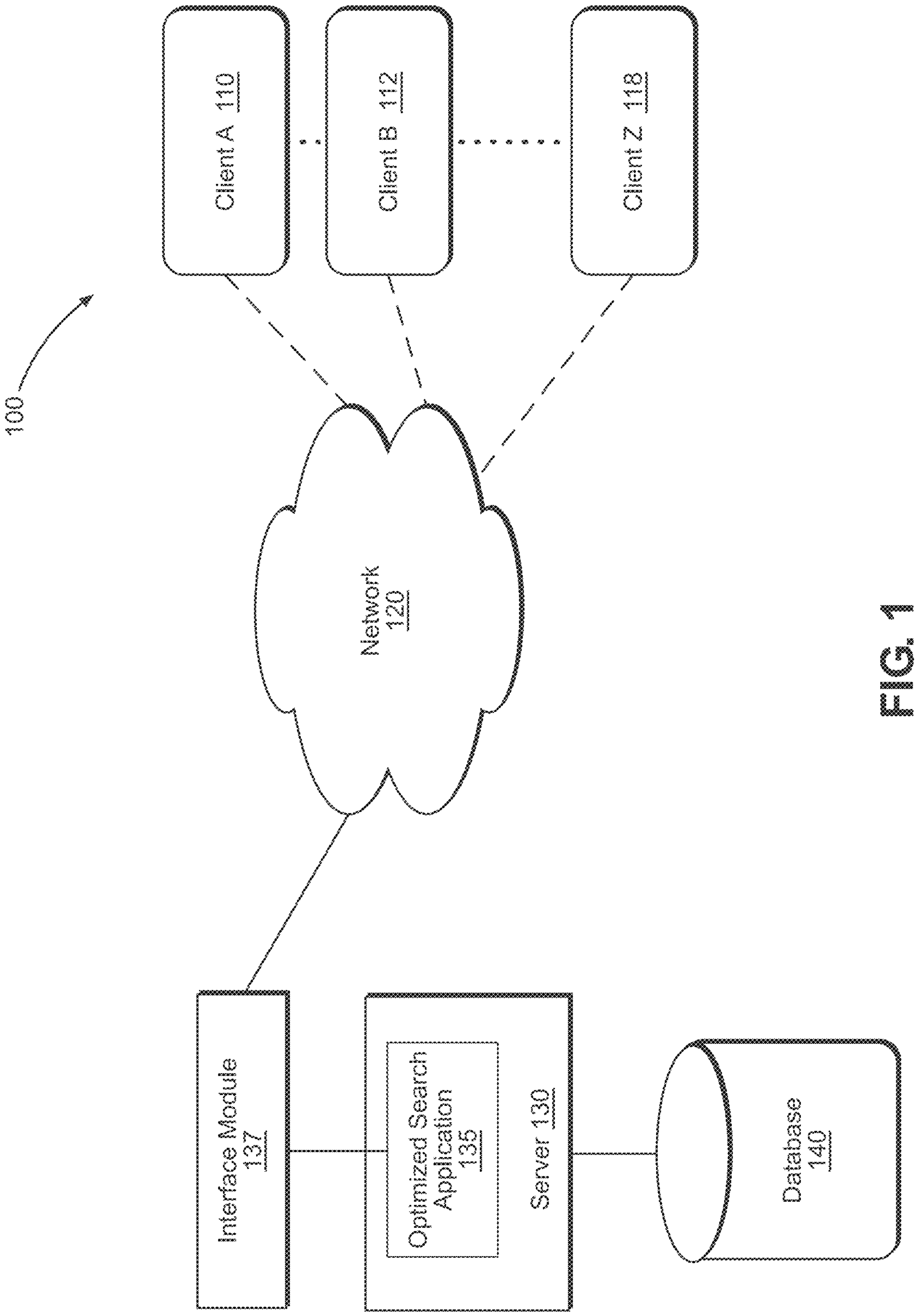
FIG. 1 is a block diagram of an exemplary networking environment in accordance with various embodiments of the present invention.

The present disclosure pertains to an advanced system for optimized search for content highlighting in legal and document review environments, notably within e-discovery applications or tools. Specifically, this advanced system allows users to efficiently access, review, and search large volumes of custodian digital data or case data. This advanced system is essential during a review phase when legal professionals review the case data, enabling those legal professionals to analyze and search vast data sets with ease. The system is equipped to handle extensive textual data that is spread across thousands of rows, thousands of columns, and multiple worksheets. The system allows users to enter search terms and obtain search results in an optimal fashion, such that users can easily view search results via a web browser.

Also, the system provides significant computational efficiency by way of optimized searches (character, text, symbol or numerical searches and searches of any combination thereof) of workbooks, worksheets and/or documents. In some embodiments, the system performs optimized searches on Microsoft® Excel® formatted data, including but not limited to Microsoft® Excel® workbooks, worksheets and/or documents. The system can perform the optimized searches on a vast number of search terms (not just one search term) across all the worksheets of an entire workbook in a very short time, in comparison with traditional systems. The significant computational efficiency and lessened requirements for computer resources can be attributed to the pre-processing of cell data via multithreads and the indexing of cell data, which will be explained later herein.

Furthermore, this advanced optimized search system addresses a multitude of challenges that traditional systems face. First, traditional systems oftentimes only provide searching of single worksheets only. In contrast, the advanced system described herein enables a workbook-wide search of a multitude of search terms in one search, by searching across all worksheets (sometimes referred to as "sheets)" of a workbook for significant computational efficiency. Second, traditional systems usually require time-consuming manual searches. In other words, traditional systems allow only one manual search of a single string at a time to be executed on a single worksheet at a time. To address this challenge of manual searches, the advanced system as described herein provides exact location information and/or precise details (such as sheet, row, column and character index details) of where to locate a search result that matches the optimized search within a workbook.

Third, traditional systems provide no support for multiple keywords. In addressing this problem, the advanced system provides multi-keyword support by allowing users to search using multiple keywords for thorough and accurate search results. The fourth challenge that traditional search systems face is that they do not allow searches that support the use of regex (regular expressions). The advanced system described herein includes regex compatibility. That is, the advanced system supports pattern matching regex for searching complex patterns effectively and efficiently.

Finally, traditional systems provide very limited text highlighting support. Traditional systems only allow a word search by cell in only one worksheet at a time. In contrast, the advanced system herein offers partial text highlighting, which enhances visual focus by highlighting parts of the text in search results. This partial text highlighting can be conducted in one search for all the worksheets of a given workbook, usually in a matter of seconds. Also, the partial text highlighting advantageously provides users with a quick, precise, and easy way to visually locate the search results text in a cell in one or more worksheets of a workbook on a computing device display through a web browser. All of these innovative technical features of the advanced system and more will be described in greater detail later herein.

In summary, the present technology represents a significant advancement in eDiscovery tools, offering multi-keyword search in a given workbook in its entirety, providing support for regular expressions to be utilized in optimized searches, parallel multi-threading, and partial text highlighting in a workbook for performance optimizations. It provides a user-friendly and computationally efficient tool for searching Microsoft® Excel® formatted data, thereby resulting in optimized quick and accurate search results.

EXAMPLE EMBODIMENTS

FIG. 1 is a block diagram of an exemplary networking environment 100 in accordance with embodiments of the present invention. The networking environment 100 includes clients A 110, B 112, and so forth through client Z 118 (additional or fewer clients may be implemented), a network 120, a server 130 with an optimized search application 135 and an interface module 137, and a database 140. As with all of the figures provided herein, one skilled in the art will recognize that any number of elements 110-140 can be present in the networking environment 100 and that the exemplary methods described herein can be executed by one or more of elements 110-140. Any number of any of elements 110-140 can be present in the networking environment 100, and the networking environment 100 is configured to serve these elements. For example, the server 130 may transmit a report via the network 120 to clients 110-118, despite the fact that only three clients are depicted in FIG. 1. For all figures mentioned herein, like numbered elements refer to like elements throughout.

Clients 110-118 may be implemented as computers having a processor that runs software stored in memory, wherein the software may include network browser applications (not shown) configured to render content pages, such as web pages of e-discovery platforms, from the server 130. Clients 110-118 can be any computing device, including, but not limited to desktop computers, laptop computers, mobile devices, smartphones, and portable digital assistants (PDAs). The clients 110-118 may communicate with a web service provided by the server 130 over the network 120. Additionally, the clients 110-118 may be configured to store an executable application that encompasses one or more functionalities provided by the optimized search application 135.

The network 120 can be any type of network, including but not limited to the Internet, LAN, WAN, a telephone network, and any other communication network that allows access to data, as well as any combination of these. The network 120 may be coupled to any of the clients 110-118, the interface module 137, and/or the server 130. As with all the figures provided herewith, the networking environment 100 is exemplary and not limited to what is shown in FIG. 1.

The server 130 can communicate with the network 120 and the database 140. It will be apparent to one skilled in the art that the embodiments of this invention are not limited to any particular type of server and/or database. For example, the server 130 may include one or more application servers, one or more web servers, or a combination of such servers. In some embodiments, the servers mentioned herein are configured to control and route information via the network 120 or any other networks (additional networks not shown in FIG. 1). The servers herein may access, retrieve, store and otherwise process data stored on any of the databases mentioned herein. In general, the server 130 implements at least an e-discovery platform that is configured to provide the optimized search features disclosed herein.

Interface Module 137 may be implemented as a machine separate from server 130 or as hardware, software, or combination of hardware and software implemented on server 130. In some embodiments, Interface Module 137 may relay communications between the optimized search application 135 and Network 120.

The database 140 may be configured to store one or more documents, as well as one or more tables, workbooks, and/or worksheets of data, which may be accessible to the optimized search application 135.

The clients 110-118 may interface with the optimized search application 135 on the server 130 via the network 120 and the interface module 137. The optimized search application 135 may receive requests and/or data from the clients 110-118. The clients 110-118 may provide data for storage in the database 140, and therefore may be in communication with the database 140. Likewise, the optimized search application 135 may access the database 140 based on one or more requests received from the clients 110-118. This storage can be local (on client devices or on-premises servers) or cloud-based, depending on the system design and data security requirements. Further details as to the data communicated in the networking environment 100 are described more fully herein.

Figure 2:
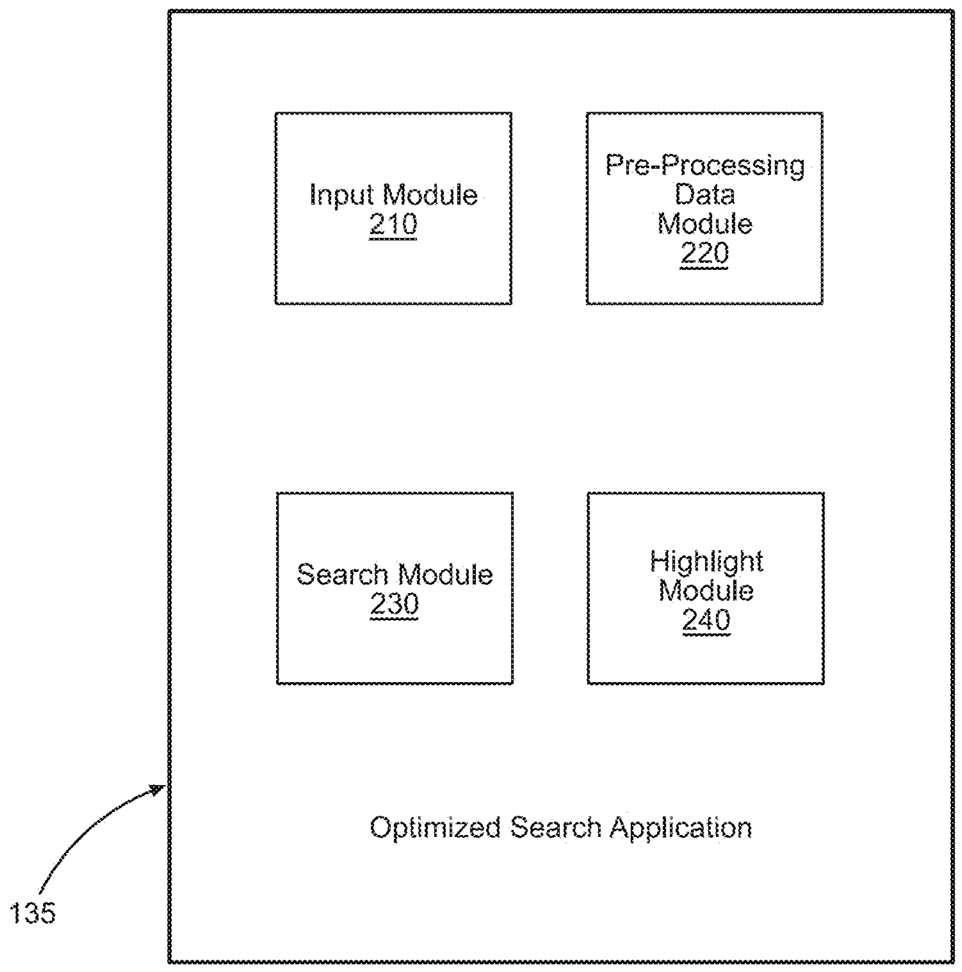
FIG. 2 is an example flowchart of a method that can be executed by an example system.

FIG. 2 is a block diagram of an exemplary architecture of a system in the form of an optimized search application 135. Specifically, FIG. 2 as shown depicts further details of the optimized search application 135, which is also shown as part of the networking environment 100 of FIG. 1. The optimized search application 135 may include one or more modules for performing one or more methods as described herein. According to various embodiments of the present technology, the optimized search application 135 includes an input module 210, a pre-processing data module 220, a search module 230, and a highlighting module 240. The responsibilities and tasks of each of these modules will be described later herein. Each of the modules 210-240 may communicate with one another. Although various modules may be configured to perform some or all of the various steps described herein, fewer or more modules may be provided and still fall within the scope of various embodiments.

Figure 3:
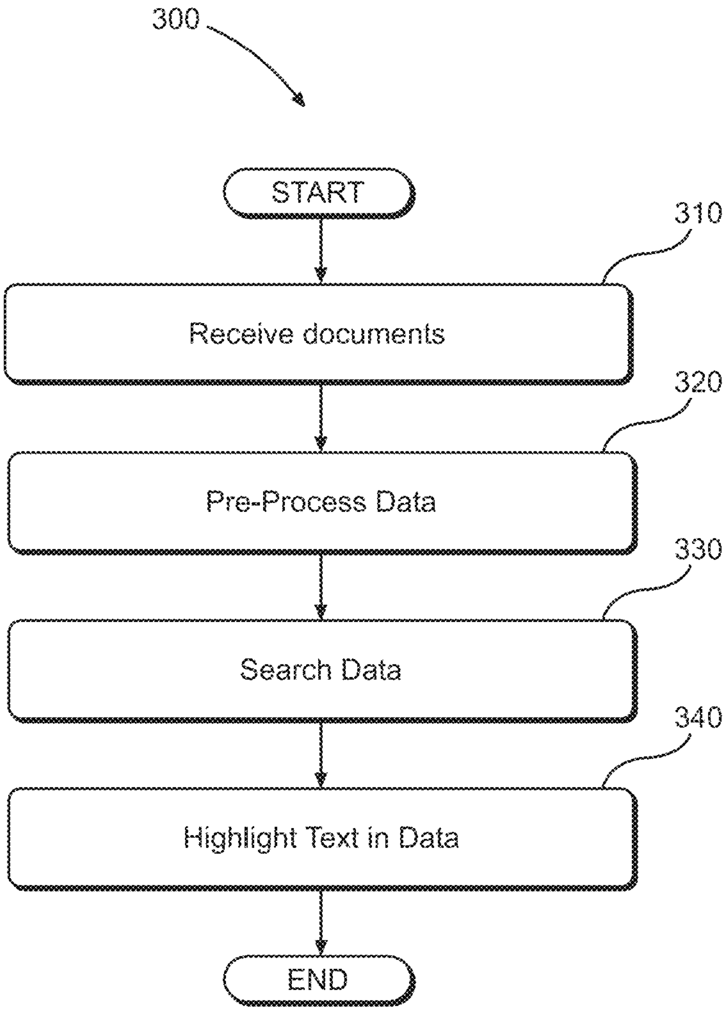
FIG. 3 is a flow diagram of an exemplary method for optimized searches of documents in accordance with various embodiments of the present invention.

Now referring to FIGS. 2 and 3, collectively, in some embodiments, the modules 210-240, respectively, of FIG. 2 are responsible for performing the steps 310-340, respectively, of a method for optimized searches 300 as depicted in FIG. 3. Specifically, the method 300 (FIG. 3) for optimized searches begins with a step 310 of receiving an input of documents. That is, the documents are received by the system. No pre-processing of the documents is conducted at this stage. The input of documents is merely stored in a database or a cloud storage service, such as Amazon S3®. The input module 210 (FIG. 2) of the optimized search application 135 is responsible for receiving the input of documents and storing the documents.

The document types of the inputted documents may include, but are not limited to, workbook documents, Microsoft® Excel® formatted documents (such as a Microsoft® Excel® workbook with a plurality of worksheets), spreadsheets having columns and rows of cells, documents that have text in tabular format, and the like. If the input of documents is not one of those types, then the documents can be converted to one of document types by the input module 210. For example, the input module 210 can convert the documents to workbook documents, tabular documents, or Microsoft® Excel® formatted documents having workbooks which include one or more worksheets per workbook. Further details of this step 310 of receiving an input of documents will be provided later herein.

Then, the method 300 (FIG. 3) continues with a step 320 of pre-processing data. The pre-processing data module 220 (FIG. 2) of the optimized search application 135 is responsible for pre-processing and indexing the cell data of the documents, which lends to the computational efficiency of the optimized search application 135. Further details of this pre-processing and indexing of the cell data will be provided later herein.

The method 300 (FIG. 3) continues with a step 330 of searching the cell data. As stated above, the cell data is typically in Microsoft® Excel® formatted data that has been indexed. The search module 230 (FIG. 2) of the optimized search application 135 is responsible for the searching of the cell data by conducting the search over an indexed file of the data (rather than the native data or document itself), which also contributes to the computational efficiency of the optimized search application 135. Further details of the searching of the cell data will be provided later herein.

Finally, the method 300 (FIG. 3) concludes with a step 340 of highlighting text in the data. The highlighting module 240 (FIG. 2) of the optimized search application 135 is responsible for the highlighting of the text in the tabular data, which allows for end users to easily see the search results on a display through a web browser via the optimized search application 135. The highlighting can include partial highlighting of text in a cell of a worksheet or spreadsheet of a workbook. Further details of this highlighting of the data will be provided later herein.

Figure 4:
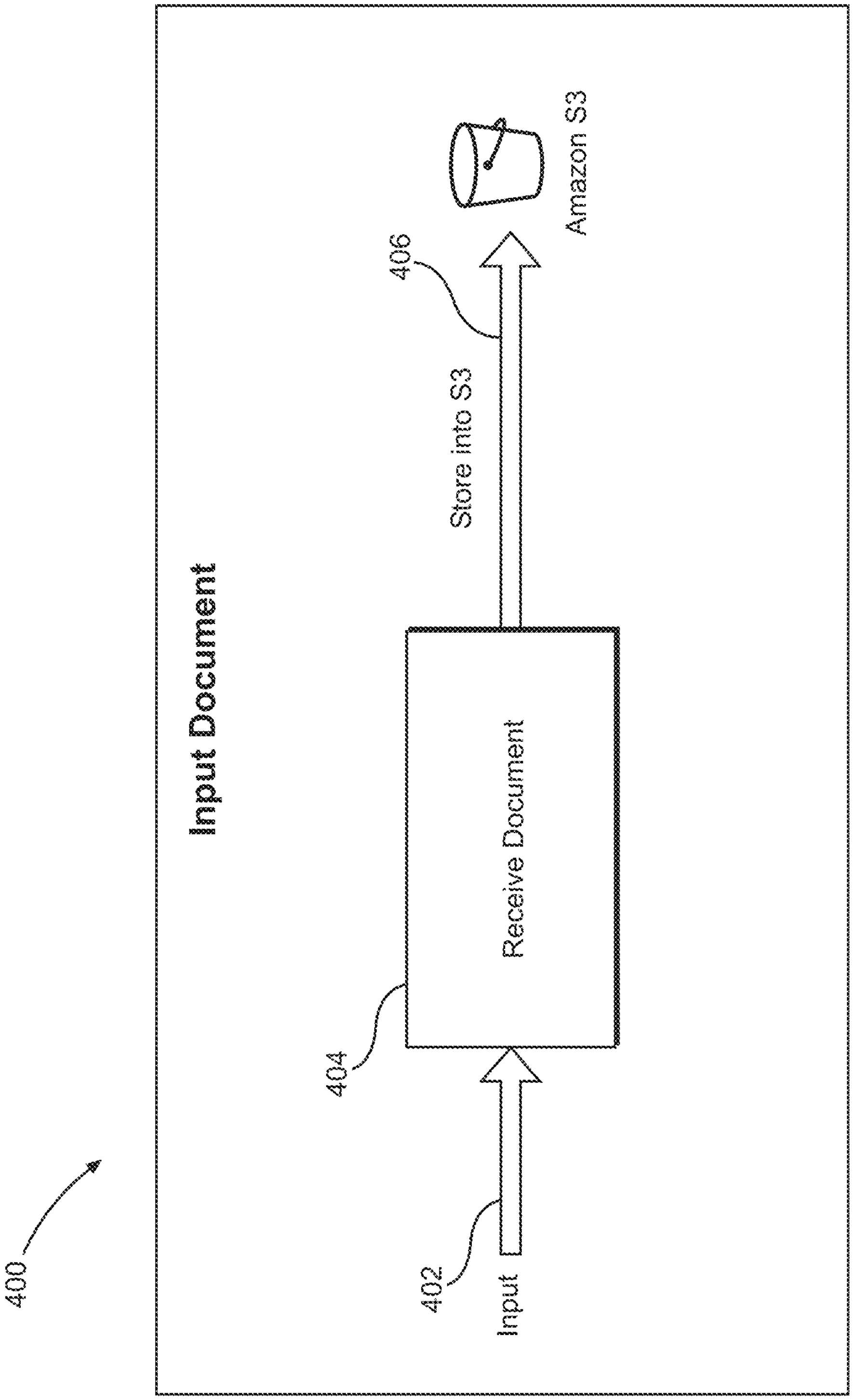
FIG. 4 is a flow diagram of an exemplary method for inputting spreadsheet or workbook documents that can be executed by an example system, in accordance with various embodiments of the present invention.

Now turning to FIG. 4, FIG. 4 is a flow diagram of an exemplary method 400 for inputting documents that can be executed by the advanced optimized search system. In some embodiments, the method 400 of FIG. 4 can be performed by the input module 210 (FIG. 2) of the optimized search application 135. At step 402, an input of one or more documents occurs. The input can be a user input of workbook documents into the system. The input itself can include uploading the documents onto the system. At step 404, the one or more documents are received by the system. At step 406, the received one or more documents are stored in a cloud storage space, such as Amazon S3®. It can be appreciated that in some embodiments, the storage space where the received documents are stored can be the database 140 of FIG. 1. At this point, no pre-processing of the data within the document has been performed. In some embodiments, the steps 402-406 of FIG. 4 can be considered substeps or subroutines of the method 400 (FIG. 4) of receiving an input of documents.

Figure 5:
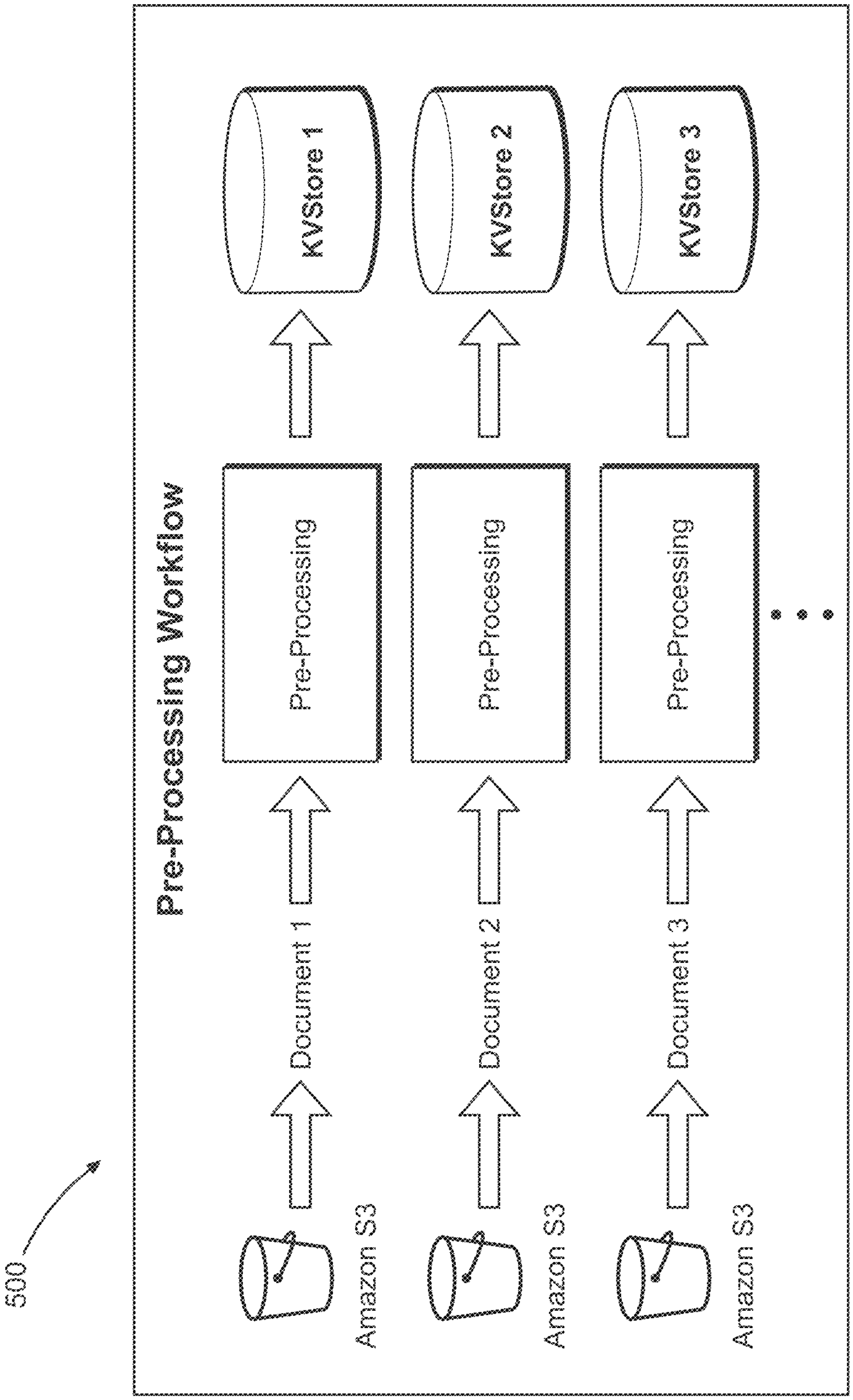
FIG. 5 depicts an exemplary embodiment of a workflow for pre-processing data in accordance with various embodiments of the present invention.

Moving onto FIG. 5, FIG. 5 depicts an exemplary embodiment of a workflow 500 for pre-processing data in accordance with various embodiments of the present invention. In some embodiments, the system utilizes multithreading processors of computers in order to pre-process each worksheet of a workbook, by dividing or partitioning each worksheet into a separate thread. Furthermore, in some embodiments, the advanced optimized search system pre-processes each document separately and stores the preprocessed data of a given document in a separate key-value store (KVStore). Thus, as shown in FIG. 5, the cell data of three documents (namely, Document 1, Document 2, and Document 3, respectively) are pre-processed. The pre-processed cell data of Document 1, Document 2, and Document 3, respectively, is later stored in separate key-value stores (namely, KVStore 1, KVStore2, and KVStore3, respectively).

Figure 6:
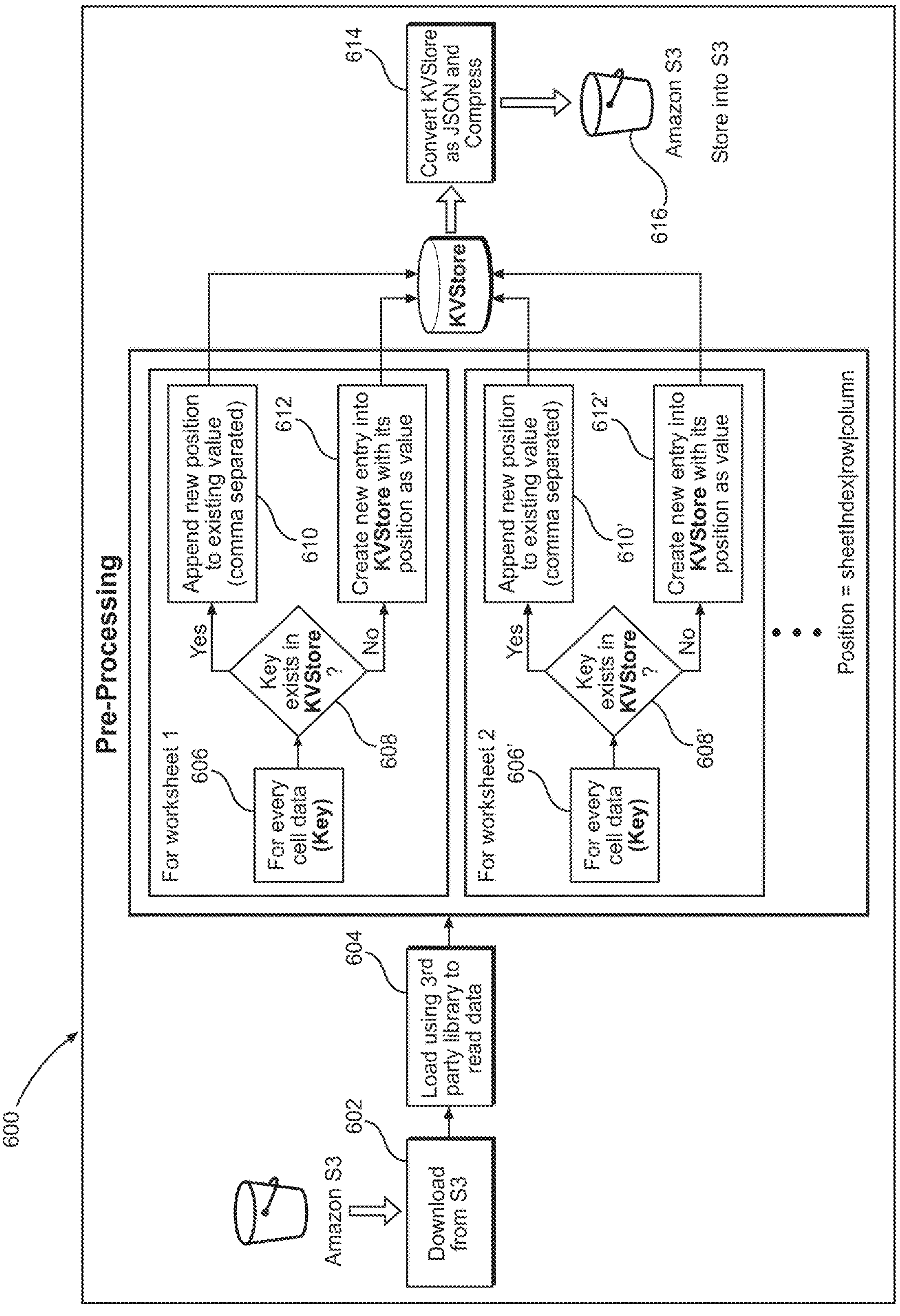
FIG. 6 is a flow diagram of an exemplary method for pre-processing data that can be executed by an example system, in accordance with various embodiments of the present invention.

Now referring to FIG. 6, FIG. 6 is a flow diagram of an exemplary method 600 of pre-processing data in accordance with various embodiments of the present invention. In method 600, the system pre-processes and indexes cells to enable lightning-fast, workbook-wide searches, which traditional Microsoft® Excel® tools cannot do. In some embodiments, the method 600 of FIG. 6 can be performed by the pre-processing data module at step 320 (FIG. 3) of the optimized search application 135.

At step 602, the stored document (which was stored in step 406 of FIG. 4) is downloaded from a database or a cloud storage space, such as Amazon S3®. It can be appreciated that in some embodiments, the database where the document is stored can be the database 140 of FIG. 1. At step 604, the document is uploaded to a library (which can be a third party library) to read the data of the document, cell by cell. In some embodiments, the library reads and/or extracts all the data, including the header data, footer data and any other textual data that can be extracted from the workbook document.

Then, steps 606-612 are performed for each of the worksheets of a workbook. In the example provided in FIG. 6, there are two worksheets (worksheet 1 and worksheet 2). For worksheet 1, steps 606-612 are depicted. For worksheet 2, corresponding steps 606'-612' are depicted.

At step 606, the method 600 proceeds to a cell of a worksheet. For the data of a cell (which is known as the key), at step 608, a determination is made whether the key (the data of the cell at hand) exists in a key-value store (KVStore). The KVStore is a database that stores cell data of the document at hand in the format of key-value pairs. The KVStore can be thought of the master data of all the worksheets of a given workbook. There is a single key-value store for all the worksheets of that workbook, and the key-value index is built across all the worksheets. The KVStore is created one time when any new file is ingested into the system platform. In other words, for each document stored, there is a separate KVStore.

At this stage, indexing of the cell data occurs. If the key exists in the KVStore, then at step 610, a new position is appended to the existing value, separated by a comma. The position is defined as sheetIndex|row|column. On the other hand, if the key does not exist in the KVStore, then at step 612, a new entry is created in the KVStore and the key's position is shown as a value. Again, the position is defined as sheetIndex|row|column.

In exemplary embodiments, the cycle of steps 606-612 is repeated until all the cells of the one or more worksheets are completely pre-processed. If there are a plurality of worksheets in a workbook, the pre-processing of the data is accomplished quickly since each worksheet is divided from the rest of the worksheets and processed in a separate thread. In other words, the present disclosure allows for multi-threading processors to process multiple worksheets in parallel, which is an improvement of the technology. Also, the multithreading itself streamlines the processes and utilizes computer resources more efficiently.

Once the data of the worksheets is pre-processed, at step 614, the KVStore is converted into a JSON format and compressed. Finally, at step 616, the KVStore is stored in a database or a cloud storage service, such as Amazon S3®. It can be appreciated that in some embodiments, the database where the KVStore is stored can be the database 140 of FIG. 1. In some embodiments, the steps 602-616 of FIG. 6 can be considered substeps or subroutines of the step 320 (FIG. 3) of pre-processing data.

Figure 7:
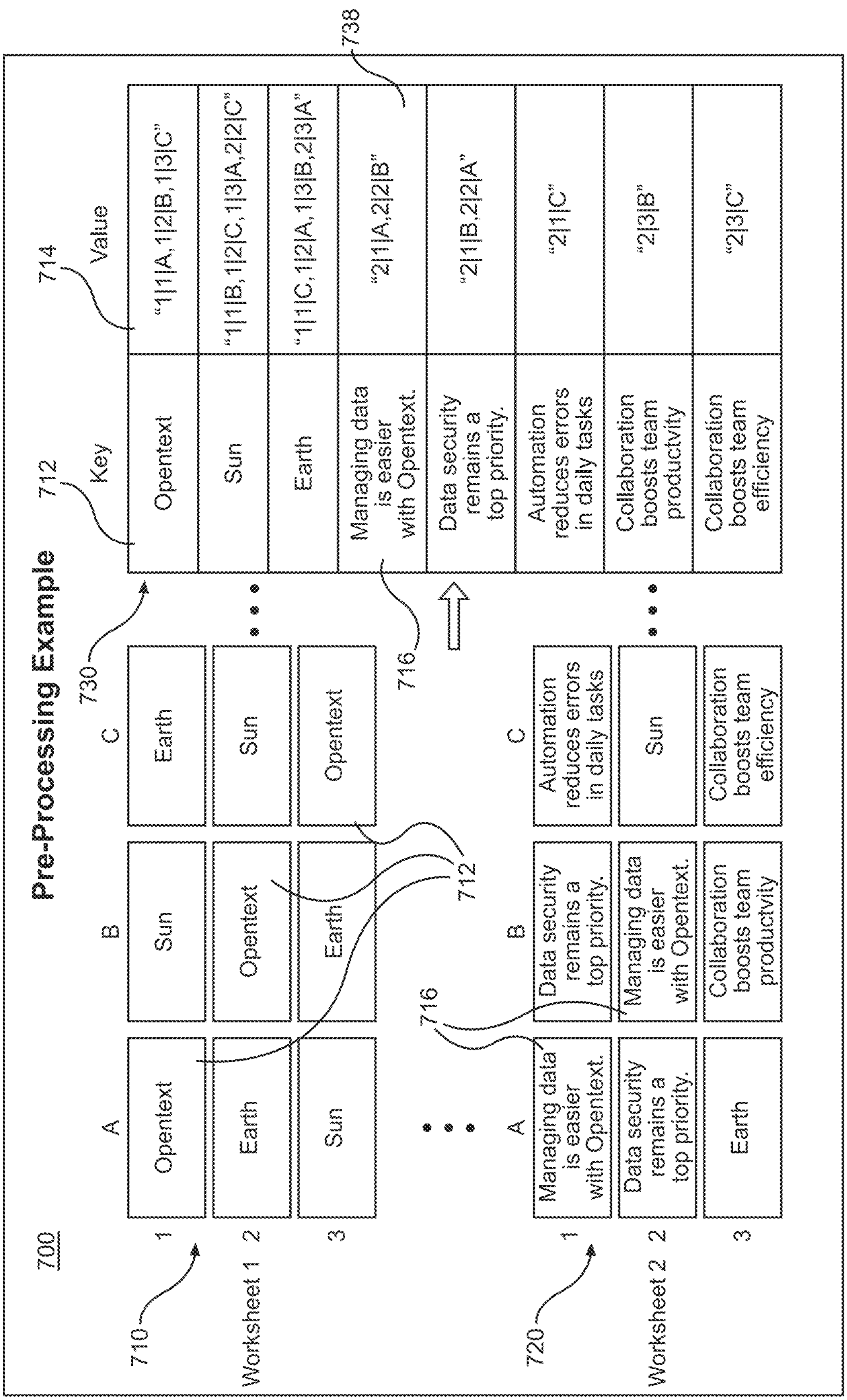
FIG. 7 depicts an example of pre-processing data in accordance with various embodiments of the present invention.

FIG. 7 depicts an example 700 of pre-processing data in accordance with various embodiments of the present invention. On the left side of FIG. 7, two worksheets are shown. Specifically, a first worksheet (labeled "Worksheet 1") has a table 710 having 3 rows and 3 columns (also known as a 3×3 table). The rows of the table 710 are shown as rows 1, 2, and 3, while the columns of the table 710 are shown as columns A, B, and C. A second worksheet (labeled "Worksheet 2") has a table 720 having 3 rows and 3 columns (also known as a 3×3 table). The rows of the table 720 are also shown as rows 1, 2, and 3, while the columns of the table 710 are labeled as columns A, B, and C.

Figure 8:
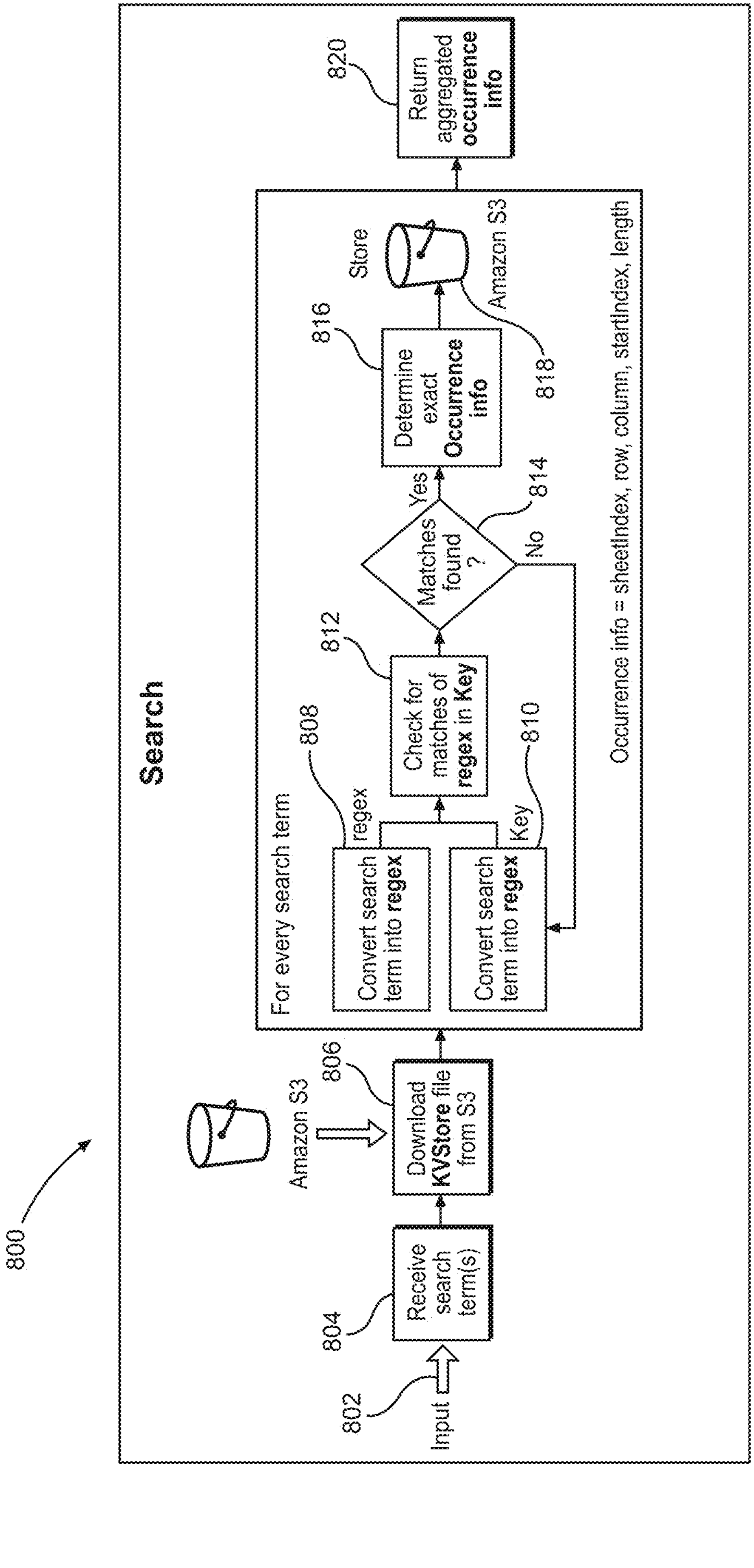
FIG. 8 is a flow diagram of an exemplary method for searching terms that can be executed by an example system, in accordance with various embodiments of the present invention.

A key-value pairs table 730 as stored in the KVStore is depicted on the right side of FIG. 8. In FIG. 7, a cell data (or key) 712 of the text "Opentext" has three occurrences in Worksheet 1. Specifically, the cell data (or key) of "Opentext" can be found in Worksheet 1, row 1, column A. Thus, the corresponding key "Opentext" 712 in the key-value pairs table 730 shows a string of values 714, where the first value has a position of "1|1|A." The position is defined as sheetIndex|row|column. Therefore, the position "1|1|A" refers to worksheet 1, row 1, column A.

The other two occurrences of the cell data (or key) 712 of "Opentext" can be found in Worksheet 1, row 2, column B and Worksheet 1, row 3, column C. Therefore, the corresponding key of "Opentext" 712 in the key-value pairs table 730 shows a second value having a position of "1|2|B" and a third value having a position of "1|3|C", separated by commas. As shown in step 610 of FIG. 6, if a key already exists in a KVStore, then new positions are appended to an existing value separated by commas.

Sentences, words, phrases, partial text, characters, numbers, and punctuation can also be included as data in a cell. Referring now to the second worksheet (labeled "Worksheet 2"), the table 720 has a cell data (or key) of the text "Managing data is easier with Opentext." Cell data 716 has two occurrences in Worksheet 2. Specifically, the cell data 716 can be found in Worksheet 2, row 1, column A and Worksheet 2, row 2, column B. Thus, the corresponding key "Managing data is easier with Opentext." Cell data 716 in the key-value pairs table 730 shows a string of values, where the value 738 indicates that the positions are "2|1|A, 2|2|B."

FIG. 8 is a flow diagram of an exemplary method 800 for searching terms that can be executed by an example system, in accordance with various embodiments of the present invention. In some embodiments, the method 800 of FIG. 8 can be performed by the search module 230 (FIG. 2) of the optimized search application 135.

In some embodiments, the steps 802-820 of FIG. 8 can be considered substeps or subroutines of the step 330 (FIG. 3) for searching data. At step 802, one or more search terms are inputted, sometimes by a user of the example system. At step 804, the one or more search term(s) are received by the system. At step 806, the KVStore file for the specific document to be searched per the user's requirements is downloaded from a database or a cloud storage space, such as Amazon S3®. In some embodiments, the database where the KVStore file is stored can be the database 140 of FIG. 1. The KVStore file is an indexed file. It is important to note that the actual searching of the data is not performed over a native workbook, but rather the searching based on the user's inputted search terms is performed over the indexed file.

Then, at step 808, the one or more search term(s) are converted into regex (a regular expression). Starting at step 810, the method 800 proceeds with a given key in the KVStore. For every key in the KVStore, at step 812, a check or a determination is made whether the regex matches with the key. If no matches are found at step 814, the method 800 returns to step 810 where the method proceeds with the next key in the KVStore file. However, if a match is found at step 814, then at step 816, the exact occurrence information (also referred to as occurrence info) is determined. The occurrence info is defined as sheetIndex, row, column, startIndex, length. It should be noted that the first three parameters of the occurrence info (namely, sheetIndex, row, column) are the same parameters of a position, which is shown as a value of a given key. As shown in FIG. 6, the position is defined as sheetIndex|row|column. The startIndex is the position of the first character of the search keyword, as determined by using regex. The startIndex is stored in memory and retrieved. The length refers to the length of the span of the search keyword by the number of characters. Thus, as shown in the example provided in FIG. 10, for the search keyword of "Open" the length is 4, meaning there are 4 characters in the search keyword "Open".

At step 818, the occurrence information is stored in a database, such as Amazon S3®. In some embodiments, the database where the occurrence info is stored can be the database 140 of FIG. 1. At step 820, the aggregated occurrence information is returned.

Figure 9:
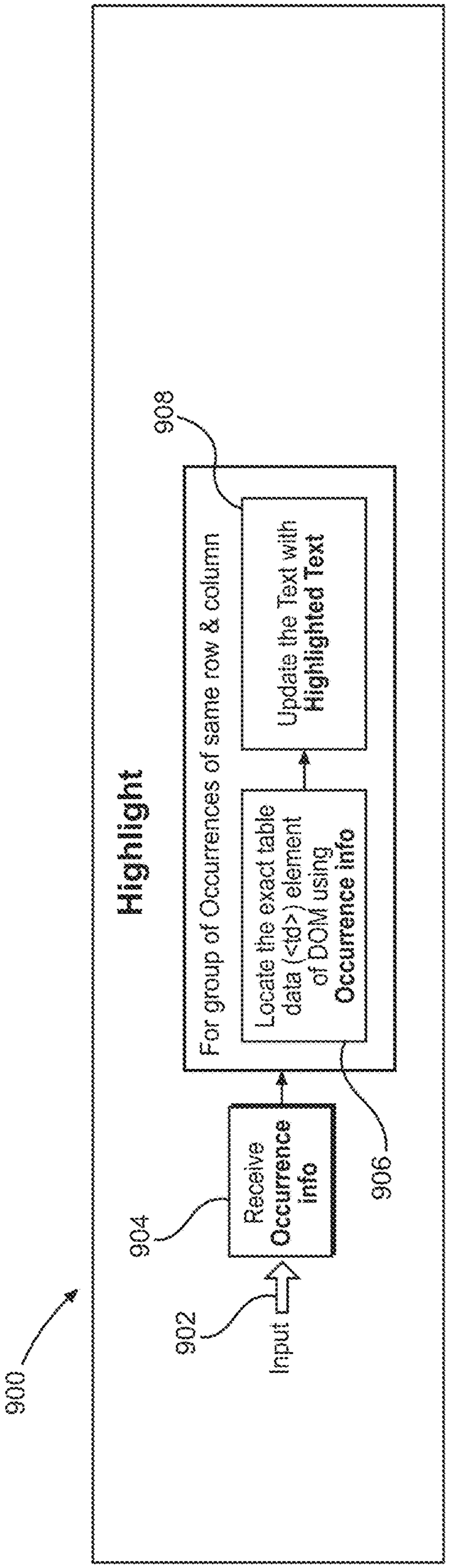
FIG. 9 is a flow diagram of an exemplary method for highlighting terms that can be executed by an example system, in accordance with various embodiments of the present invention.

In some embodiments, at step 820, the aggregated occurrence information is stored in a database of the computing system and returned as a portion of search results in response to the one or more search terms inputted in step 802. The aggregated occurrence information can be returned to the document review and electronic discovery software platform system, such as in step 904 of FIG. 9. Alternatively, if the one or more search terms were originally inputted in step 802 by a user, the aggregated occurrence information can be returned or provided to the user via a computing device associated with the user, in answer to the user's request for search results matching their search terms. As an example, if the user puts a search term for the search keyword “Open”at step 802, and there are four occurrences of the search keyword “Open” at step 820, the user is provided with the aggregated occurrence information indicating where the four occurrences of the word “Open” are located. Further, those four occurrences can be displayed to the user via a display of a computing device associated with the user. In some embodiments, the aggregated occurrence information can be displayed to the user in a list. In some embodiments, based on the occurrence information, text of a search result matching the one or more search terms is displayed to the user, by way of a user interface of the workbook document that is generated by the system. Alternatively, the aggregated occurrence information can be displayed to the user by any other means, such as bolding or otherwise altering the visual appearance of the four occurrences of the word “Open” in the worksheet(s) based on the aggregated occurrence information and displaying the word “Open” to the user in the worksheet(s) where the search keyword “Open” can be found. Turning to FIG. 9, FIG. 9 is a flow diagram of an exemplary method 900 for highlighting terms that can be executed by an example system, in accordance with various embodiments of the present invention. At step 902, an input of one or more search term(s) or keyword(s) is received. Then, at step 904, the occurrence information is received. The occurrence information can be the aggregated occurrence information that is returned in step 820 of FIG. 8. At step 906, for a group of occurrences of the same row and column, the exact table data (<td>) element is located in the Document Object Model (DOM) using occurrence info. At step 908, the text is updated with highlighted text. As the user navigates freely throughout a workbook, throughout a worksheet, or by switching from one worksheet to another worksheet, via the user interface, search results that match the search terms are highlighted (in a color such as yellow highlight) for easy viewing by the user. It should also be noted that the system generates or mimics a Microsoft® Excel® representation using its own logic to generate a UI of rows and columns using HTML, which demonstrates the performance optimizations of the partial text highlighting. Also, partial text highlighting is not available in native Microsoft® Excel®. Using traditional systems, if a search of a search term is done using the technology of native Microsoft® Excel®, native Microsoft® Excel® only highlights an entire cell that contains the search result, not the partial text or the precise location or portion of the cell that has the search result.

Figure 10:
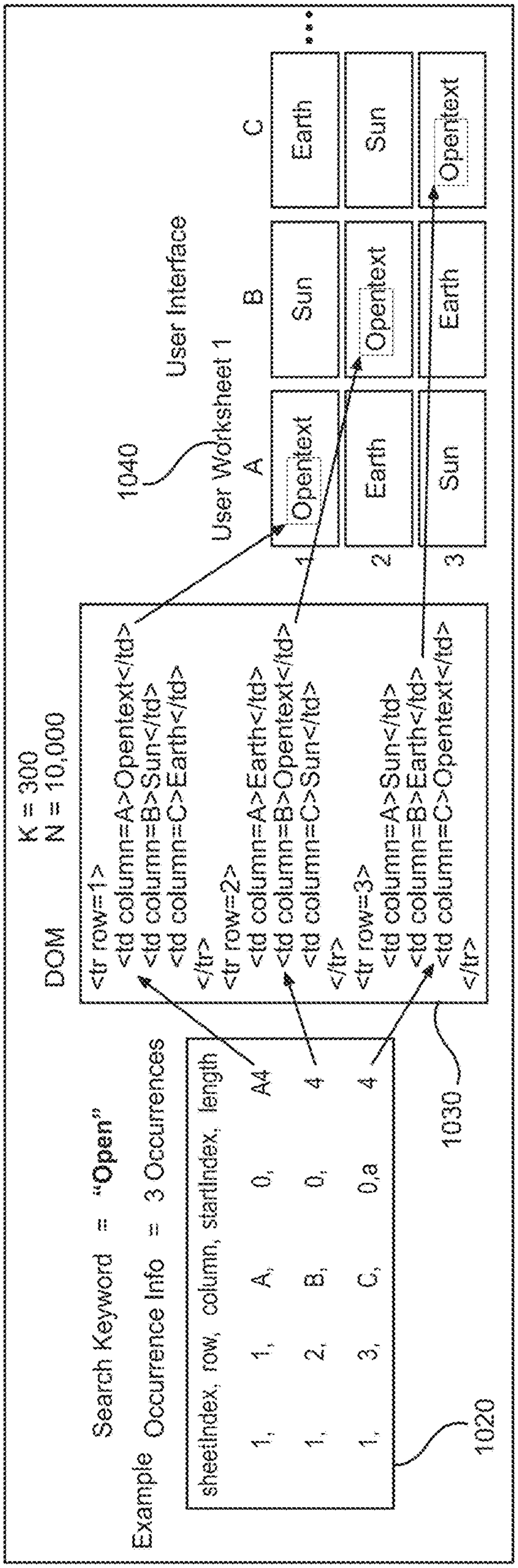
FIG. 10 depicts an example of highlighting terms in accordance with various embodiments of the present invention.

FIG. 10 depicts an example of highlighting terms in accordance with various embodiments of the present invention. In this example, the user's search keyword is “Open”. There are occurrences of “Open” and the occurrence info is shown in a list 1020, providing the sheetIndex, row, column, startindex, and length. The exact table data elements are located in a Document Object Model (DOM) 1030 using the occurrence info. Then, the keyword “Open” is highlighted in yellow in a table 1040 of Worksheet 1 as displayed on a user interface. It should be noted that the partial text “Open” of the word “Opentext” is highlighted in yellow in each of the three occurrences in the table 1040. The search results are highlighted on a table via the user interface using HTML tags like (<td>), so the search results will appear to the user to be included as part of a Microsoft® Excel® worksheet, despite the fact that the advanced system described herein is in fact not an application of Microsoft® Excel®.

Figure 11:
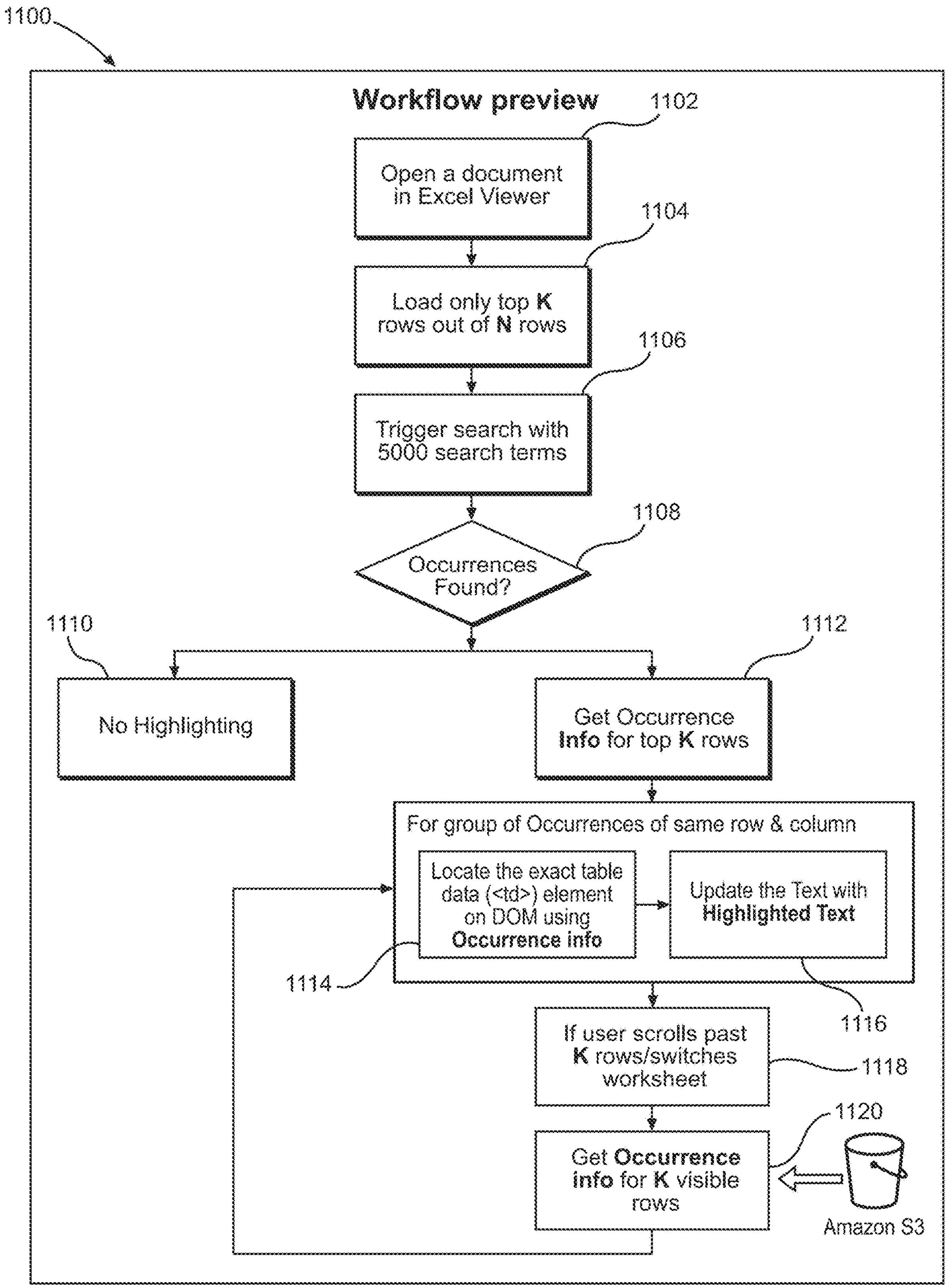
FIG. 11 is an example flowchart of a workflow preview method that can be executed by an example system in accordance with various embodiments of the present invention.

FIG. 11 is an example flowchart of a workflow preview method 1100 that can be executed by an example system in accordance with various embodiments of the present invention. The method 1100 begins with step 1102, when a document is opened in Excel Viewer. At step 1104, only top K rows out of N rows are loaded (such as the top 200 rows out of 10,000 rows). At step 1106, a search is triggered with 5000 search terms. At step 1108, a determination is made whether any occurrence of the 5000 search terms is found. If no occurrence is found, at step 1110, no highlighting of text is performed. However, if one or more occurrences are found, at step 1112, the occurrence information (occurrence info) for the top K rows is obtained. Then, for a group of occurrences of a same row and column, at step 1114, the exact table data (<td>) element is located in the Document Object Model (DOM) using occurrence information. At step 1116, the text is updated with highlighted text. At step 1118, a determination is made whether the user has scrolled past the top K rows or switched to another portion of the worksheet or a different worksheet altogether. If indeed the user has scrolled past the top K rows or switches worksheets, then at step 1120, the occurrence information for the visible K rows is obtained from a cloud storage service (such as Amazon S3®) that is storing the occurrence information.

Figure 12:
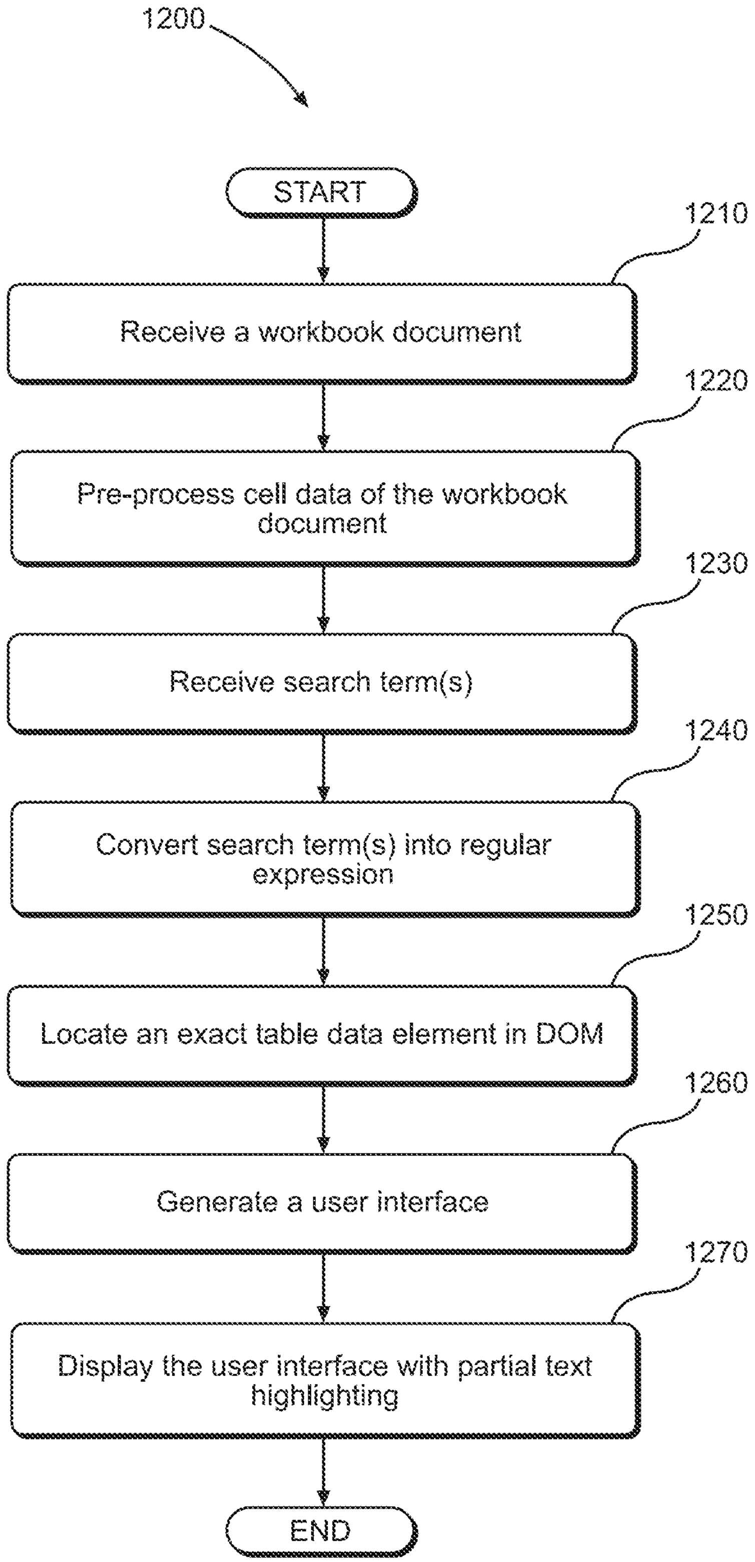
FIG. 12 is an example flowchart of a method that can be executed by an example system in accordance with various embodiments of the present invention.

FIG. 12 is an example flowchart of a method 1200 for optimizing a search in a document review and electronic discovery software platform that can be executed by an example system in accordance with various embodiments of the present invention. At step 1210, a workbook document is received by the document review and electronic discovery software platform. The workbook document includes one or more worksheets. Each worksheet includes cell data, which is the data in one or more cells of the worksheet.

At step 1220, the cell data of the workbook document is pre-processed. In some embodiments, the pre-processing of the cell data occurs in parallel multi-threads processed by one or more computer processors, in order to enhance computer performance and processing efficiency, and to quickly obtain the search results of the optimized search.

Specifically, continuing with step 1220, during the pre-processing of the cell data, the cell data of the workbook document is extracted or read. The extraction or reading of the cell data can be performed by a library or a third party library/service. Then, the cell data is partitioned into multi-threads, where each of the multithreads represents each of the one or more worksheets of the workbook document. As mentioned earlier, the system utilizes multithreading processors of computers in order to pre-process each worksheet of a workbook, by dividing or partitioning each worksheet into a separate thread. Furthermore, the advanced optimized search system preprocesses the cell data of each document separately and stores the preprocessed cell data of a given document in a separate key-value store (KVStore). As shown earlier in FIG. 5, the cell data of three documents (namely, Document 1, Document 2, and Document 3, respectively) are pre-processed. The pre-processed cell data of Document 1, Document 2, and Document 3, respectively, is later stored in separate key-value stores (namely, KVStore 1, KVStore2, and KVStore3, respectively).

For each worksheet of the workbook document, the cell data is indexed to generate an indexed file. Indexing of the cell data includes determining whether a key exists in the key-value store. The key-value store is configured to store the indexed cell data in key-value pairs, where a value includes a position of a key. When the key exists in the key-value store, a new position is appended to an existing value associated with the key. When the key does not exist in the key-value store, a new key-value entry is created in the key-value store, and the position of the key is indicated or provided as a value in the new key-value entry. This process repeats until all the cell data for each worksheet of the workbook document has been indexed. Once the cell data of the workbook document is indexed, the search for the one or more search terms is conducted on the indexed cell data without having to directly access the workbook document itself.

When all the cell data is indexed, the indexed file is stored in the key-value store associated with the workbook document. The key-value store associated with the workbook document is stored in a same folder that stores the workbook document in the database or the cloud storage service. Once the cell data of the worksheets is pre-processed, the key-value store is converted into a JSON format and compressed.

At step 1230, one or more search terms are received. These search terms are usually input by a user of the document review and electronic discovery software platform. The search terms are to be used in the optimized search of the workbook document. When the one or more search terms are received for a given workbook document, only the key-value store associated with that particular workbook document is accessed and searched. The key-value store associated with the workbook document, as mentioned before, is stored in the same folder that stores the workbook document in the database or the cloud storage service, so it is easy to identify which key-value store must be accessed. Also, the key-value store and the workbook document share the same document ID (DOC ID). Hence, no other key-value store needs to be accessed and searched. This allows for performance optimization and a quicker search.

At step 1240, the one or more search terms are converted into a regular expression. Then, for every key of the key-value store, a determination is made whether the regular expression matches the key; and when the regular expression matches the key, occurrence information is determined.

Specifically, for every key in the key-value store, a check or a determination is made whether the regex matches with the key. If no matches are found, the method 1200 proceeds with the next key in the key-value store file. However, if a match is found, then the exact occurrence info is determined, where the occurrence info is defined as sheetIndex, row, column, startIndex, length. It should be noted that the first three parameters of the occurrence info (namely, sheetIndex, row, column) are the same parameters of a position which is shown as a value of a given key. The startIndex is the position of the first character of the search keyword, as determined by using regex. The startIndex is stored in memory and retrieved. The length refers to the length of the span of the search keyword or search result by the number of characters. The occurrence information is stored in a database or storage space, such as Amazon S3®. In some embodiments, the database where the occurrence info is stored can be the database 140 of FIG. 1. The aggregated occurrence information is then returned.

At step 1250, based on the occurrence information, an exact table data element in a Document Object Model (DOM) is located. At step 1260, based on the Document Object Model (DOM), a user interface depicting a worksheet of the workbook document is generated or updated. Based on the exact table data element in the Document Object Model (DOM) and the occurrence information, partial text highlighting of a text of a search result in the generated user interface takes place. The partial text highlighting comprises highlighting the text of the search result within a portion of a cell of the worksheet.

Finally, at step 1270, the user interface depicting the worksheet with the partial text highlighting of the search result is displayed to the user, via the document review and electronic discovery software platform.

It will be understood that the present disclosure is not limited to merely what is depicted in FIG. 12. That is, the method 1200 of FIG. 12 can include any steps of the method 400 (FIG. 4) and any other methods described above, including those methods that are described in conjunction with FIGS. 5-11.

Figure 13:
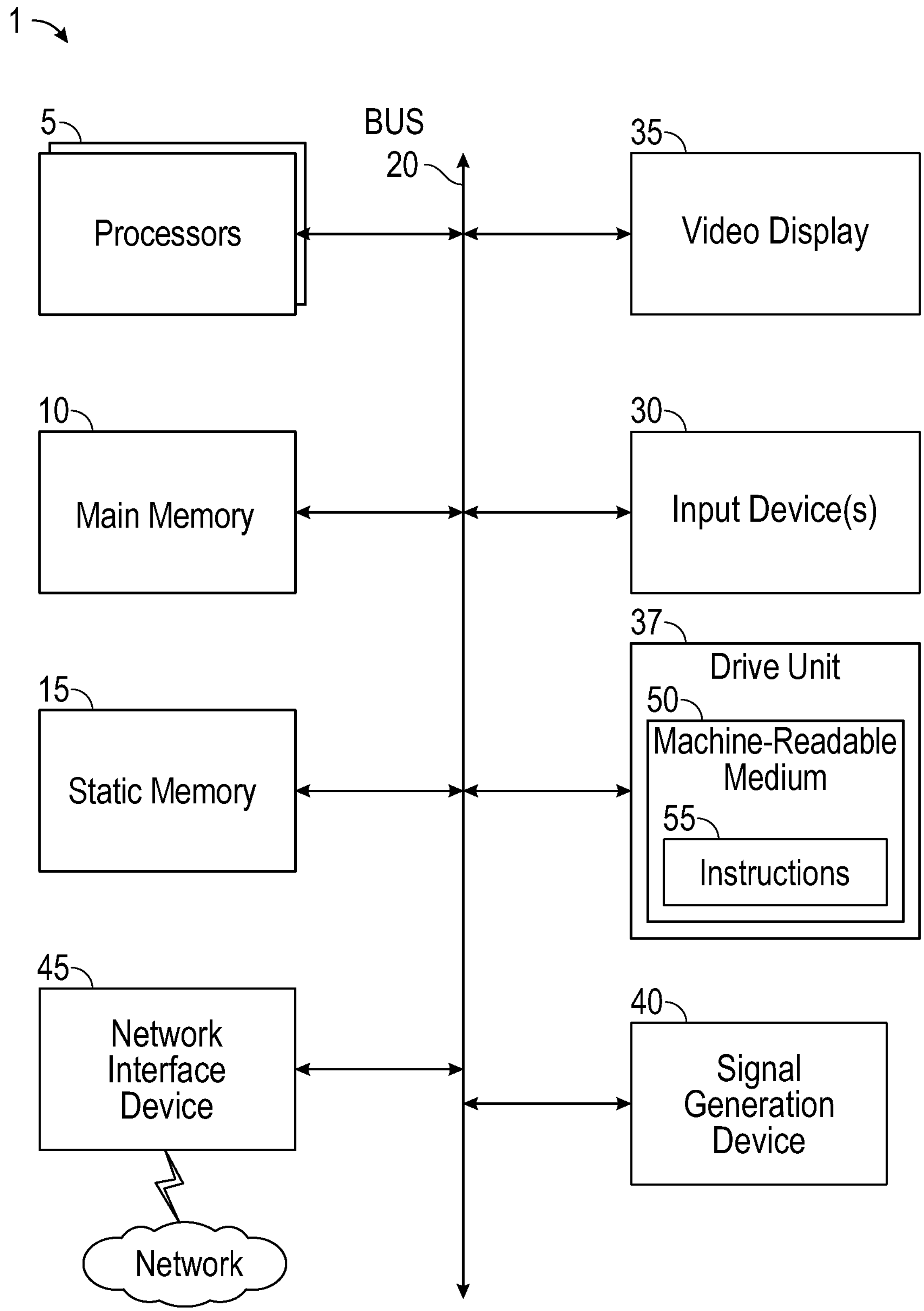
FIG. 13 illustrates a computer system according to exemplary embodiments of the present technology.

FIG. 13 is a diagrammatic representation of an example machine in the form of a computer system 1, within which a set of instructions for causing the machine to perform any one or more of the methodologies discussed herein may be executed. The system can be used to control any one or more of the components disclosed above.

In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Where appropriate, the functions described herein can be performed in one or more of hardware, software, firmware, digital components, or analog components. For example, the encoding and or decoding systems can be embodied as one or more application specific integrated circuits (ASICs) or microcontrollers that can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

What is claimed is:

1. A method for partial content highlighting in a document review and electronic discovery software platform, the method comprising:

receiving a workbook document, the workbook document having one or more worksheets, each worksheet having cell data, the cell data being data in one or more cells of the worksheet;

pre-processing by multithreads, via one or more computer processors, the cell data of the workbook document, the pre-processing comprising:

extracting the cell data of the workbook document;

partitioning the cell data into the multithreads, the multithreads representing each of the one or more worksheets of the workbook document; and for each worksheet of the workbook document:

indexing the cell data to generate an indexed file; and storing the indexed file in a key-value store associated with the workbook document, the key-value store configured to store the indexed cell data in key-value pairs, where a value includes a position of a key;

receiving one or more search terms to be used in a search of the workbook document;

converting the one or more search terms into a regular expression;

for every key of the key-value store:

determining whether the regular expression matches the key; and when the regular expression matches the key, determining occurrence information;

based on the occurrence information:

locating an exact table data element in a Document Object Model (DOM);

based on the Document Object Model (DOM) and using HTML, generating or updating a user interface (UI), via the document review and electronic discovery software platform, the user interface depicting a worksheet of the workbook document; and based on the exact table data element in the Document Object Model (DOM) and the occurrence information, partial text highlighting of a text of a search result in the generated user interface, the partial text highlighting comprising highlighting the text of the search result within a portion of a cell of the worksheet; and displaying the generated user interface depicting the worksheet with the partial text highlighting of the text of the search result, via the document review and electronic discovery software platform.

2. The method of claim 1, wherein the partial text highlighting provides visual focus by highlighting parts of the text in the search result.

3. The method of claim 1, wherein the displaying the generated user interface further comprises displaying the generated user interface on a display associated with a computing device via a web browser.

4. The method of claim 1, wherein the partial text highlighting is conducted in one search for each of the one or more worksheets of the workbook document.

5. The method of claim 1, wherein the partial text highlighting further comprises highlighting the search result on a table via the user interface using HTML tags, such that the search result will appear to be included as part of the one or more worksheets.

6. The method of claim 1, wherein the partial text highlighting comprises any color.

7. The method of claim 1, wherein the partial text highlighting comprises yellow highlighting.

8. The method of claim 1, wherein the indexing the cell data further comprises:

determining whether the key exists in the key-value store;

when the key exists in the key-value store, appending a new position to an existing value associated with the key; and when the key does not exist in the key-value store:

creating a new key-value entry in the key-value store; and indicating the position of the key as a value in the new key-value entry.

9. The method of claim 8, further comprising:

converting the key-value store into a JSON format; and compressing the key-value store.

10. The method of claim 1, wherein the occurrence information is defined as sheetIndex, row, column, startIndex, length.

11. A system for partial content highlighting in a document review and electronic discovery software platform, comprising:

a processor and memory for storing instructions, the processor executing the instructions to:

receive a workbook document, the workbook document having one or more worksheets, each worksheet having cell data, the cell data being data in one or more cells of the worksheet;

pre-process by multithreads, via one or more computer processors, the cell data of the workbook document, the pre-process comprising:

extract the cell data of the workbook document;

partition the cell data into the multithreads, the multithreads representing each of the one or more worksheets of the workbook document; and for each worksheet of the workbook document:

index the cell data to generate an indexed file; and store the indexed file in a key-value store associated with the workbook document, the key-value store configured to store the indexed cell data in key-value pairs, where a value includes a position of a key;

receive one or more search terms to be used in a search of the workbook document;

convert the one or more search terms into a regular expression;

for every key of the key-value store:

determine whether the regular expression matches the key; and when the regular expression matches the key, determine occurrence information;

based on the occurrence information:

locating an exact table data element in a Document Object Model (DOM);

based on the Document Object Model (DOM) and using HTML, generating or updating a user interface (UI), via the document review and electronic discovery software platform, the user interface depicting a worksheet of the workbook document; and based on the exact table data element in the Document Object Model (DOM) and the occurrence information, partial text highlighting of a text of a search result in the generated user interface, the partial text highlighting comprising highlighting the text of the search result within a portion of a cell of the worksheet; and displaying the generated user interface depicting the worksheet with the partial text highlighting of the text of the search result, via the document review and electronic discovery software platform.

12. The system of claim 11, wherein the partial text highlighting provides visual focus by highlighting parts of the text in the search result.

13. The system of claim 11, wherein the displaying the generated user interface further comprises displaying the generated user interface on a display associated with a computing device via a web browser.

14. The system of claim 11, wherein the partial text highlighting is conducted in one search for each of the one or more worksheets of the workbook document.

15. The system of claim 11, wherein the partial text highlighting further comprises highlighting the search result on a table via the user interface using HTML tags, such that the search result will appear to be included as part of the one or more worksheets.

16. The system of claim 11, wherein the partial text highlighting comprises any color.

17. The system of claim 11, wherein the partial text highlighting comprises yellow highlighting.

18. The system of claim 11, wherein the indexing the cell data further comprises:

determining whether the key exists in the key-value store;

when the key exists in the key-value store, appending a new position to an existing value associated with the key; and when the key does not exist in the key-value store:

creating a new key-value entry in the key-value store; and indicating the position of the key as a value in the new key-value entry.

19. The system of claim 18, wherein the processor is further configured for:

converting the key-value store into a JSON format; and compressing the key-value store.

20. The system of claim 11, wherein the occurrence information is defined as sheetIndex, row, column, startIndex, length.

* * * * *